United States Patent
Versteijnen

[19]
[11] Patent Number: 6,102,052
[45] Date of Patent: Aug. 15, 2000

[54] MILK STORAGE TANK CLEANING

[75] Inventor: Carolus Marinus Bernard Versteijnen, Groningen, Netherlands

[73] Assignee: Alfa Laval Agri AB, Tumba, Sweden

[21] Appl. No.: 09/068,001

[22] PCT Filed: Oct. 27, 1995

[86] PCT No.: PCT/EP95/04271

§ 371 Date: Jun. 2, 1998

§ 102(e) Date: Jun. 2, 1998

[87] PCT Pub. No.: WO97/16265

PCT Pub. Date: May 9, 1997

[51] Int. Cl.[7] .............................. B08B 3/04; B08B 9/08; B08B 9/093

[52] U.S. Cl. ................ 134/22.1; 134/18; 134/22.18; 134/22.17; 134/22.19; 134/24; 134/25.3; 134/26; 134/28; 134/29; 134/36; 134/57 R; 134/95.1; 134/99.2; 134/100.1

[58] Field of Search ................. 134/22.1, 22.18, 134/22.17, 22.19, 24, 25.3, 26, 28, 29, 36, 57 R, 95.1, 99.2, 100.1

[56] References Cited

U.S. PATENT DOCUMENTS

| | | | |
|---|---|---|---|
| 3,814,291 | 6/1974 | Van Zutphen et al. | 222/148 |
| 3,860,018 | 1/1975 | Reiter | 134/26 |

FOREIGN PATENT DOCUMENTS

| | | |
|---|---|---|
| 8280975 | 1/1977 | Australia . |
| 0603150 | 11/1993 | European Pat. Off. . |
| 2302793 | 10/1976 | France . |
| 2446686 | 8/1980 | France . |
| 2459084 | 1/1981 | France . |
| 1212344 | 3/1966 | Germany . |
| 134658 | 2/1946 | Sweden . |
| 316947 | 11/1969 | Sweden . |
| 1186313 | 4/1970 | United Kingdom . |
| WO9202787 | 2/1992 | WIPO . |

*Primary Examiner*—Zeinab El-Arini
*Attorney, Agent, or Firm*—Hovey, Williams, Timmons & Collins

[57] ABSTRACT

During a rinsing stage a first quantity of water is accumulated in a buffer reservoir and the tank is rinsed. During a washing stage a second quantity of water is accumulated and the milk tank is washed. A first period of time used for accumulating the first quantity is measured. A second period of time is determined from the measured first period of time and either the first quantity and the second quantity or the ratio between the first quantity and the second quantity. During the washing stage water is supplied during the second period of time. A flexible and reliable method of dosing the second quantity of water essentially independently of the prevailing water pressure is obtained, which does not require a correspondingly large reservoir or any instruments specially provided for measuring the second quantity of water.

12 Claims, 3 Drawing Sheets

MILK STORAGE TANK CLEANING

BACKGROUND OF THE INVENTION

1. Field of the Invention

Milk produced on dairy farms is generally collected by milk trucks every day or every other day. As milk is produced, it is fed from the milking parlour into a milk tank in which it is temporarily stored until it is collected by the milk truck. Such milk tanks are usually cleaned each time after the stored milk has been collected by the milk truck. The invention relates to a method of cleaning such a milk tank and to an apparatus for carrying out that method.

2. Description of the Prior Art

From French patent application 2 446 686 a method of cleaning a milk tank is known which includes a rinsing stage and a washing stage. The rinsing stage includes the steps of accumulating at least one predetermined first quantity of water from a water supply source in a buffer reservoir and subsequently rinsing the milk tank with the accumulated water. The washing stage comprising the steps of accumulating a predetermined second quantity of water from the water supply source, adding a cleaning agent to the water to form a cleaning solution and washing the milk tank with the cleaning solution.

More specifically, the water to be supplied to the milk tank during the washing stage is also dosed by accumulating the predetermined quantity of water in the buffer tank. To fill the buffer tank, valves in water supply conduits leading to the buffer tank are maintained in an opened condition for a time sufficient for filling the buffer reservoir with the required quantity of water if the lowest expected pressure in the water supply prevails. The actual quantity of water accumulated in the buffer tank is controlled by floater operated valves. These valves are closed when the water in the buffer tank reaches a predetermined level.

One problem of this known method is the long duration of the cleaning program. It is generally desirable to reduce the duration of the cleaning program to a minimum, so the feeding of milk to the milk storage tank can be resumed as soon as possible after the milk therein has been transferred into the milk truck.

Another problem is that a large buffer reservoir is required to contain all the washing water (generally 25 to 45 liters). The large buffer tank also complicates installing the cleaning apparatus.

This known method also leaves room for improvement with respect to the reliability of the water-dosing. If the water supply pressure is below the expected minimum or if a valve in the water supply is defective, the cleaning program will be carried out without any water or with too little water. Also, problems at the discharge side of the buffer tank, for example choking-up of the discharge aperture causing incomplete emptying of the buffer tank, are not detected and will also cause the cleaning program to be carried out with too little water. This can lead to incomplete removal of milk residues or cleaning agents. Insufficient cleaning of the tank and cleaning agents left behind in the tank after cleaning can have such a detrimental effect upon the milk stored in the tank, that a next tankload of milk may have to be rejected.

Yet another disadvantage of this known method is that the amounts of rinsing and washing water cannot be set independently of each other.

SUMMARY OF THE INVENTION

It is an object of the invention to provide a method of cleaning a milk tank which can generally be carried out more quickly than the known method. A further object of the invention is to provide a method of cleaning a milk tank which does not require a buffer tank large enough to contain the total volume of washing water. The invention is also aimed at providing a method which is more reliable and flexible regarding the quantities of water supplied to the milk tank for rinsing and washing.

These objects are achieved by providing a method of the type described above, wherein the time required for accumulating the first quantity of water is used for calculating the time which will be required for accumulating the second quantity of water.

A first period of time used for accumulating the predetermined first quantity of water in the buffer reservoir is measured and registered. The first period of time can be measured during the rinsing stage, i.e. during one or each of the rinsing cycles, or during the washing stage. A second period of time required for accumulating the predetermined second quantity of water is determined from the measured first period of time and the first and second quantities of water. During the washing stage, water is supplied from the water supply source to the milk tank for a period of a duration equal to the calculated second period of time.

The time required for accumulating the first quantity of water in the buffer reservoir having a known volume gives a measure of the quantity of water supplied per unit of time at the time of filling of the buffer reservoir. This measure is used for determining the time required to accumulate the second quantity of water for the washing stage. Thus, variations in the water pressure—which form the main factor determining the flow rate in the water supply—are taken into account without having to reserve a period of time for accumulating the second quantity of water which would be sufficient if the lowest expected pressure prevails. It is also advantageous that it is not necessary to predict how much time would be required at the lowest expected pressure.

Since the quantity of washing water is determined on the basis of elapsed time, a small buffer reservoir for dosing batches of rinsing water can also be used for providing a measure for the generally substantially larger total quantity of washing water, which is initially accumulated in the milk tank in one single batch. A reservoir large enough to contain the total quantity of washing water or special instruments for measuring the washing water supply or the quantity of accumulated washing water are therefore not required.

The time required for accumulating the first quantity of water can also be used for monitoring the water supply. If the second quantity of water is equal to or larger than the first quantity of water, the time required for accumulating the first quantity of water can even be measured during the supply of the second quantity of water. If the time required for accumulating the first quantity of water does not fulfil a predetermined condition, e.g. the time is longer or shorter than upper or lower limit values, an indication is obtained that the water dosing may not be operating as intended. In that case an alarm signal can be generated, in response to which the cleaning apparatus and the water supply can be checked by an operator.

Since the second quantity of water is not determined by the volume of the buffer reservoir and the ratio between the first quantity of water and the second quantity of water can in principle be set freely at any desired value, the desired quantity of washing water can be set completely independently of the quantity of rinsing water accumulated in the buffer reservoir.

The invention can also be embodied in an apparatus for cleaning a milk tank, which is specifically adapted for carrying out the method according to the invention.

Particular modes for carrying out the invention are set out in the dependent claims.

DESCRIPTION OF THE PREFERRED EMBODIMENT

Figure 1:
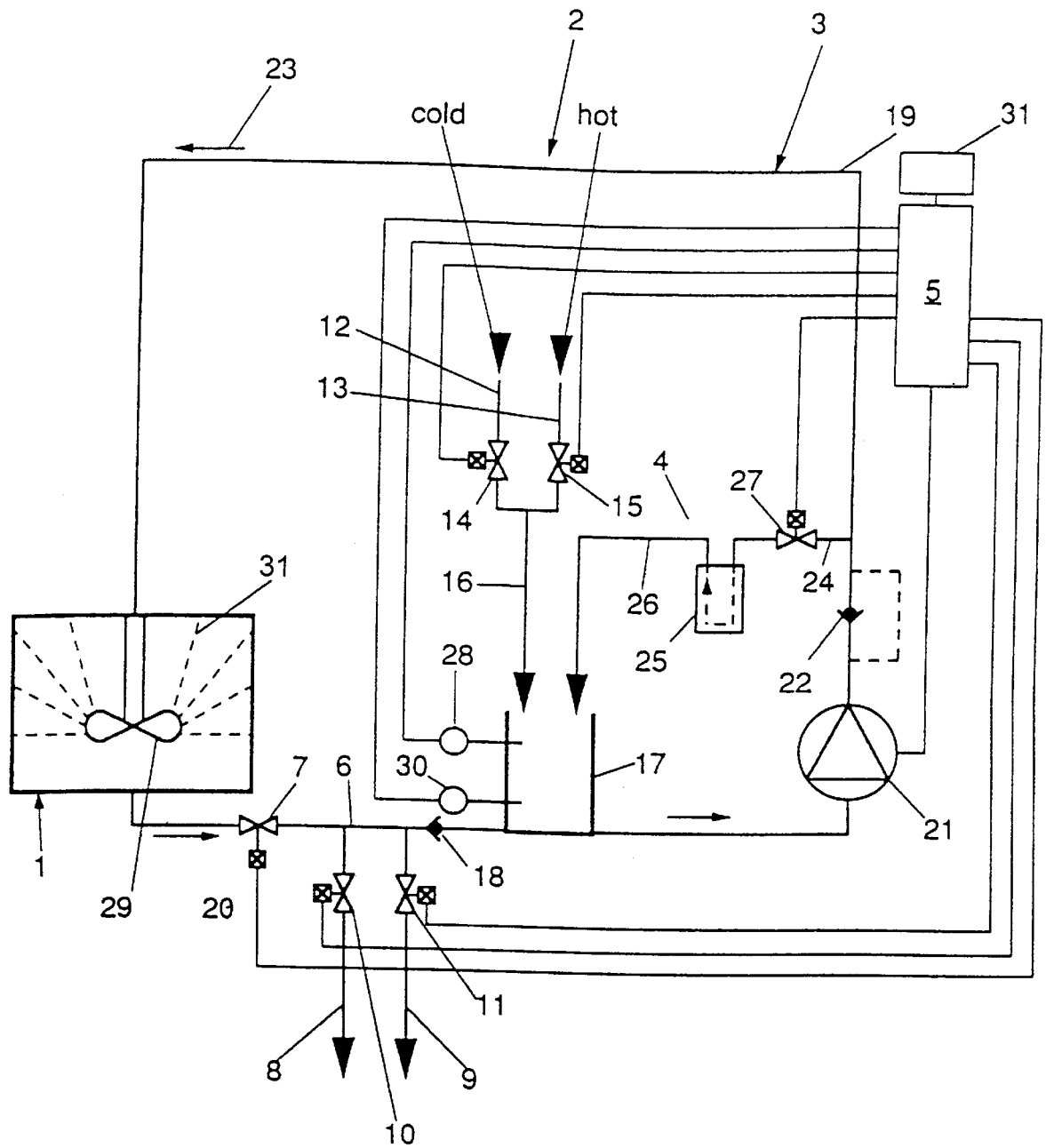
FIG. 1 is a schematic representation of an embodiment of a facility for storing milk according to the invention.

The dairy farm milk storage facility shown in FIG. 1 comprises a milk storage tank 1 in which milk obtained during milking in a dairy farm can be stored temporarily until the milk is collected by a milk truck. The milk is usually collected every day or every other day. A skilled person will appreciate that the milk storage tank 1 is provided with connections for supplying milk from a milking parlour to the milk storage tank 1 and for emptying the milk storage tank 1. As these connections can be provided in a conventional form well known in the art, these connections are not shown.

After emptying such a milk storage tank, the tank is usually cleaned. To clean the milk storage tank 1 automatically, the storage facility is provided with a cleaning apparatus 2 connected to the milk tank 1.

The cleaning apparatus 2 is provided with a water supply structure 3 communicating with the milk storage tank 1 for supplying warm and cold water to the milk storage tank 1. For mixing the water to be used for cleaning the tank with a cleaning agent, the cleaning apparatus 2 is provided with a dispensing device 4 communicating with the water supply structure 3. A control unit 5 is connected to the water supply structure 3, to the dispensing device 4 for controlling the supply of water and cleaning agent, and to a timer 31.

An upstream part of the water supply structure 3 is formed by cold and hot water supply conduits 12 and 13. The conduit 12 is connected to the mains. The conduit 13 is connected to an upstream hot water apparatus (not shown), which in turn is connected to the mains. Valves 14, 15 are arranged in the cold and hot water supply conduits 12 and 13. The valves 14, 15 are connected to and operable by the control unit 5. The cold and hot water supply conduits 12 and 13 merge into a common water supply conduit 16. The water supply conduit 16 opens into a buffer reservoir 17. The buffer reservoir 17 is provided with an upper liquid level sensor 28 and a lower liquid level sensor 30. Both these sensors 28, 30 are connected to the control unit 5 for signalling whether the liquid level in the buffer reservoir 17 is above or below the respective sensor 28 or 30.

The buffer reservoir 17 communicates with a draining conduit 6 which is connected to the milk storage tank 1. Via the draining conduit 6, liquid drained from the milk storage tank 1 can be recirculated to the buffer reservoir 17 or be discharged. A draining valve 7 is arranged in the draining conduit 6 for selectively closing off and opening the discharge conduit 6. To allow selective re-use of water drained from the tank 1, two discharge conduits 8, 9 are branched off the draining conduit 6. The first one of the conduits 8 can, for example, be connected to a dispensing system from which cattle can drink, while the other one of the conduits 9 can, for example, be connected to an effluent conduit. Valves 10, 11 are arranged in the conduits 8, 9 and connected to the control unit 5, so the discharge of fluids drained from the milk storage tank 1 can be controlled by the control unit 5. The draining conduit 6 is provided with a one-way valve 18 between the branches 8, 9 and the buffer reservoir 17. The one-way valve is mounted so as to prevent water from passing directly from the buffer reservoir 17 into the drain conduit 6 and towards the discharge conduits 8, 9. Thus, water can only be passed through the drain conduit in the direction of the arrow 20.

The buffer reservoir 17 further communicates with a transfer conduit 19 interconnecting the buffer reservoir 17 with the milk storage tank 1. A pump 21 and a one-way valve 22 downstream of the pump 21 are arranged in the transfer conduit 19. The one-way valve 22 in the transfer conduit 19 is mounted so as to prevent water from flowing in a direction opposite to the direction indicated by the arrow 23.

The dispensing device 4 comprises a recirculating conduit 24 branching off from a section of the transfer conduit 19 downstream of the pump 21, a dosing reservoir 25 and a dispensing conduit 26 opening into the buffer reservoir 17. In the recirculating conduit 24 a valve 27 connected to the control unit 5 is provided for opening and closing off the recirculating conduit 24.

The transfer conduit 19 has an orifice in the tank 1 in the form of a rotatable nozzle 29 designed to rotate if a liquid is sprayed through the nozzle and to form concentrated jets 31, preferably in the form of flat jets, which rotate along the wall of the tank 1.

The control unit 5 is programmed for conducting a cleaning program comprising the stages of rinsing the milk storage tank 1 with water, subsequently washing the milk storage tank 1 with a mixture of hot water and a cleaning agent and, finally, again rinsing the milk storage tank 1. In the cleaning apparatus shown in FIG. 1, this is achieved as is described hereinafter with reference to the flow charts shown in FIGS. 2 and 3.

When the cleaning apparatus 2 is not in operation, all the valves 7, 8, 9, 14, 15, 27 of the cleaning apparatus 2 which are operable by the control unit 5 are preferably in a "normally closed" condition to minimize the risk of milk entering the cleaning apparatus 2 or liquid from the cleaning apparatus 2 entering the tank 1 in case of a defect. Furthermore, the buffer reservoir 17 as well as at least a part of the transfer conduit 19 contain fresh water accumulated during a previous cleaning operation.

The apparatus 2 is operated in the following manner:

First, the rinsing stage is started (action 40). At 41, a value "1" is assigned to a rinsing cycle counter "n". Subsequently, the draining valves 7 and 10 are opened (action 42) and the pump 21 is activated (action 43). The pump 21, which has previously prevented water from passing through the transfer conduit 19, now pumps the water previously stored in the buffer reservoir 17 and the transfer conduit 19 (preferably 2 to 4 liters for a typical milk storage tank) through the transfer conduit 19 at such a pressure, that water from the transfer conduit 19 is sprayed into the tank 1 via the nozzle 29. In the meantime, it is checked repeatedly, whether a signal is received from the lower liquid level detector 30 indicating that the water level has fallen to the level determined by the position of the lower liquid level detector 30 (condition 44). The pump 21 is operated until a predetermined condition of the lower water level sensor 30 has been detected. The nozzle 29 is designed such that the available quantity of water causes the nozzle 29 to rotate at least 360° or correspondingly less if the nozzle 29 generates more jets distributed in the direction of rotation.

Subsequently, when a signal from the lower liquid level detector 30 indicates that the water level in the buffer tank 17 is below the detector 30, the pump 21 is deactivated by the control unit 5 (action 45). As the valve 7 in the draining conduit 6 and the valve 10 in the discharge conduit 8 are maintained in open condition, the water sprayed into the tank 1 together with milk residues rinsed from the interior of the tank 1 are drained via the draining conduit 6 and the discharge conduit 8 to the dispensing device from which cattle can drink.

After the pump 21 is stopped, it is checked whether the rinsing cycle counter n<5 (condition 46). If the result is "TRUE", the valve 14 in the cold water supply conduit 12 is opened and the timer 31 is started (action 47). If the result is "FALSE", the valve 15 in the hot water supply conduit 13 is opened and the timer 31 is also started (action 48). Then it is checked repeatedly whether a signal is received from the upper liquid level sensor 28 indicating that the water level in the buffer tank 17 has reached the upper liquid level detector 28 (condition 49). Immediately after the condition 49 has switched to "TRUE"—i.e. the water level has reached the upper liquid level sensor 28—the timer 31 is stopped and the valve 14 in the cold water supply conduit 12 is closed (action 50). The buffer reservoir 17 is now refilled with the required quantity of hot or cold water. Each time the buffer reservoir 17 is being refilled, the tank 1 is left to drain via the draining conduit 6 and the discharge conduit 8, so an efficient and effective removal of milk residues is achieved without using additional time.

During the rinsing stage, the milk storage tank 1 is pre-warmed by the hot rinsing water, which is introduced into the milk storage tank 1 during the last four rinsing cycles.

At action 51 the value t of the timer is read. This value is stored as value T1 (action 52), which is a value representing the time required to feed the predetermined first quantity of water into the buffer reservoir under the prevailing circumstances. If a previous value T1 was stored, this value is erased.

At the end of each rinsing cycle, it is checked whether the preset number of rinsing cycles—in this case eight— have been carried out by checking whether counter "n" has reached a preset value (condition 53). If the result is "FALSE", the value of the counter n is increased by "1" (action 54) and the cleaning program returns to action 43 for again activating the pump 21, so the same first quantity of water as during the previous rinsing cycle—the same quantity, not the same water—is again sprayed into the milk tank 1. The valves 7 and 10 are left open during the entire rinsing stage.

The volume of water sprayed into the tank during each rinsing cycle is determined by the vertical distance between the upper and the lower water level sensors 28 and 30 and the horizontal internal dimensions of the buffer tank 17 between the sensors 28 and 30. Since each time some water is left in the transfer conduit, the quantities of water filled into the tank and subsequently sprayed into the milk tank 1 are the same, but the water is of course not entirely the same water with which the buffer tank 17 was filled just before the respective spraying action.

Figure 3:
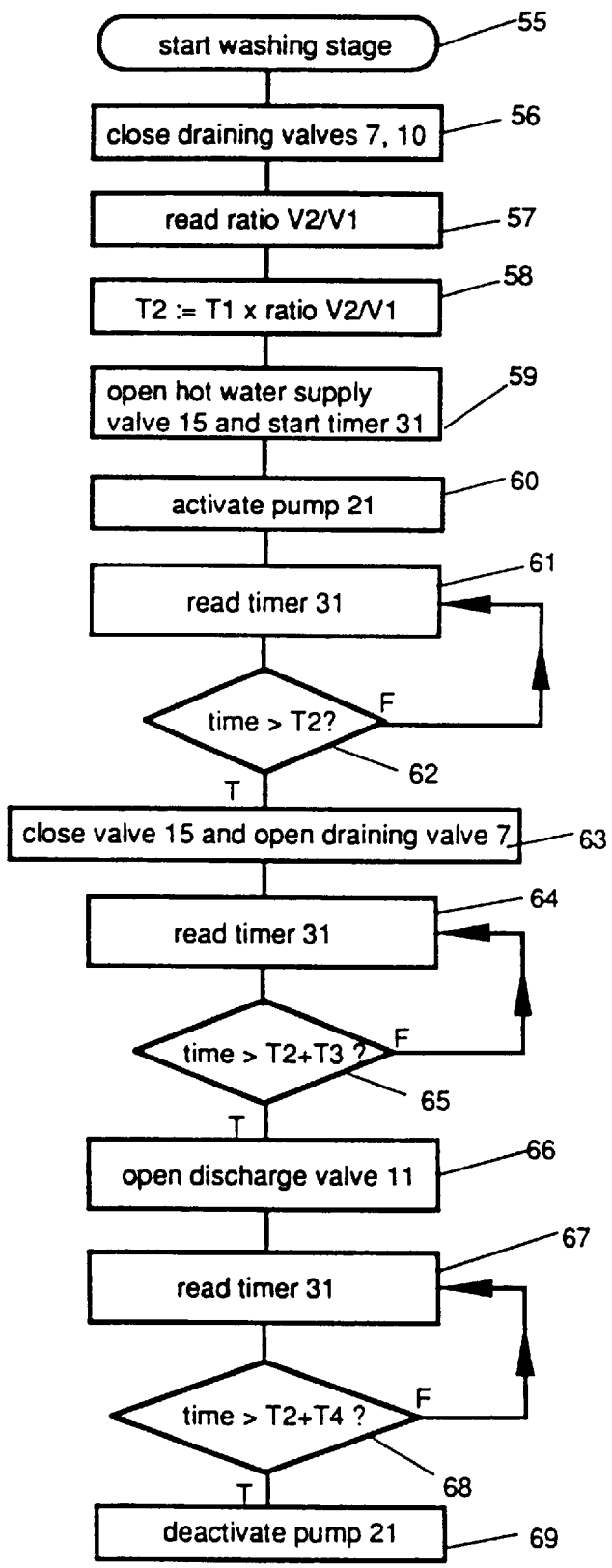
FIG. 3 is a flow chart of an exemplary mode of carrying out a washing stage of the method according to the invention.

If the condition 53 is "TRUE", the cleaning program proceeds to the start of the washing stage (action 55) shown in FIG. 3.

First, the draining and discharge valves 7 and 10 are closed (action 56) to allow accumulation of the required second quantity of washing water in the milk tank 1 and the conduits communicating with the milk tank 1. To determine the time required for filling the milk tank and the cleaning apparatus with the required second quantity of water, the ratio V2/V1 between the second quantity of water and the first quantity of water is read (action 57). Then the time T2 expected to be needed for accumulating the required second quantity V2 of washing water is calculated from the stored value T1 representing the time having elapsed during accumulation of the first quantity of water, and the ratio V2/V1 between the second quantity of water and the first quantity of water (action 58). Preferably, the first quantity of water is 2.5 to 3.5 liters and the second quantity of (washing) water is 25 to 30 liters, so the ratio V2/V1 is preferably between 3.5 and 12.

Then the valve 15 in the hot water supply conduit 13 is opened (action 59) and the pump 21 is activated (action 60).

The actions for dispensing a cleaning agent are not included in this flow chart, because the dispensing of the cleaning agent can be carried out in a conventional manner well known to those skilled in the art. A particularly suitable system and method for automatically dispensing a cleaning agent in a system associated with a milk tank are disclosed in international patent application publication no. WO 94/23564.

Since the valve 7 remains closed during the filling of the tank 1, the hot washing liquid is collected in a lower part of the tank 1.

Thereafter, a checking cycle composed of the action 61 of reading the timer 31 and checking whether T2 has been reached (condition 62) is carried out repeatedly until the result is "TRUE", i.e. until T2 is reached. Then the tank 1 has been filled with the required second quantity of water and a cleaning agent, irrespective of the prevailing water supply pressure, because the prevailing water supply pressure has been taken into account when the value T1 was measured. When T2 has been reached, the valve 15 in the hot water supply conduit 13 is closed again and the draining valve 7 is opened (action 63).

Since the quantity of washing water is determined on the basis of elapsed time, the buffer reservoir 17 does not have to be large enough to contain the total quantity of washing water. This reduces the space occupied by the cleaning apparatus and, in particular, substantially facilitates installing the apparatus. Also, special instruments for measuring the flow of washing water or the quantity of accumulated washing water are not required.

The ratio V2/V1 between the first quantity of water (used for each rinsing cycle) and the second quantity of water (used for the washing stage) can in principle be set freely at any desired value, and the desired quantity of washing water can be set completely independently of the quantity of rinsing water accumulated in the buffer reservoir 17.

When the valve 15 in the hot water supply conduit 13 is closed and the draining valve 7 is opened, the pump 21 is still running, so the accumulated water will start to recirculate from the tank 1 via the draining conduit 6, the buffer reservoir 17 and the transfer conduit 19. This condition is maintained, while timer 31 is frequently read (action 64) and it is each time checked whether a period of a preset duration T3 has elapsed since the end of the accumulation of the washing water (condition 65), until the timer has passed the time T2+T3.

Now the actual washing of the tank is finished and the draining valve 11 in the discharge conduit 9 is opened to discharge the washing water as waste water. Again timer 31 is frequently read (action 67) and it is checked repeatedly whether a preset time T4 has elapsed since the end of the accumulation of the washing water (condition 68). This cycle is carried out until the time T4–T3, which is sufficient for emptying the milk tank 1 and the cleaning apparatus system, has elapsed. Then the pump 21 is deactivated (action 69) and the washing stage is finished.

Finally, the tank is again rinsed during a further rinsing stage. The final rinsing can be carried out in a conventional manner well known to those skilled in the art.

During the initial rinsing stage, the first period of time is measured each time the predetermined first quantity of water is accumulated in the buffer reservoir 17. The first period of time can also be measured during the accumulation of the second quantity of water by delaying the activation of the pump 21 after the hot water supply is opened (action 59) until a signal has been received from the upper water level sensor 28 indicating that the water level has reached that sensor. Then the time T1 between opening of the valve 15 in the hot water supply conduit 13 and the signal from the upper water level sensor 28 is measured. The pump 21 is subsequently activated to transfer water from the buffer reservoir 17 to the milk tank, while the valve 15 in the hot water supply conduit 13 is left open until a predetermined signal is received from the lower water level sensor 30 indicating that the water level has fallen to the level of that sensor 30.

In reaction to that signal from the lower water level sensor, the pump 21 is again stopped until a signal has been received from the upper water level sensor 28 indicating that the water level has reached that sensor. In reaction to that signal, the pump is again activated to lower the water level in the buffer reservoir 17 to the level of water level sensor 30. Between the time of stopping of the pump 21 and the signal from the upper water level sensor 28, the first period of time T1 can again be measured.

This cycle including the re-measuring of the first period of time T1 used for accumulating the first quantity of water can be repeated until the time T2 has been reached. Each time the time T1 has been measured again during the accumulation of the washing water within the accumulation period of duration T2, the updated value of T1 can be used for re-calculating or re-estimating the value of T2. Thus, even variations in the water pressure during the accumulation of the second quantity of water (the washing water) can be taken into account in determining the time required for accumulating this second quantity of water.

Repeatedly measuring the time T1 used for accumulating the first quantity of water also provides the possibility of closely monitoring the supply of water by generating an alarm signal when the measured first period of time is beyond a predetermined limit value. If the time T1 increases substantially or very quickly, this is an indication that the water supply is not operating as intended. The water supply can be monitored during the rinsing stage. The water supply can be monitored during the accumulation of washing water also, if the second quantity of water is larger than the first quantity of water, and if the first quantity of water is accumulated in the buffer reservoir 17 at least once during the supply of said second quantity of water.

Figure 2:
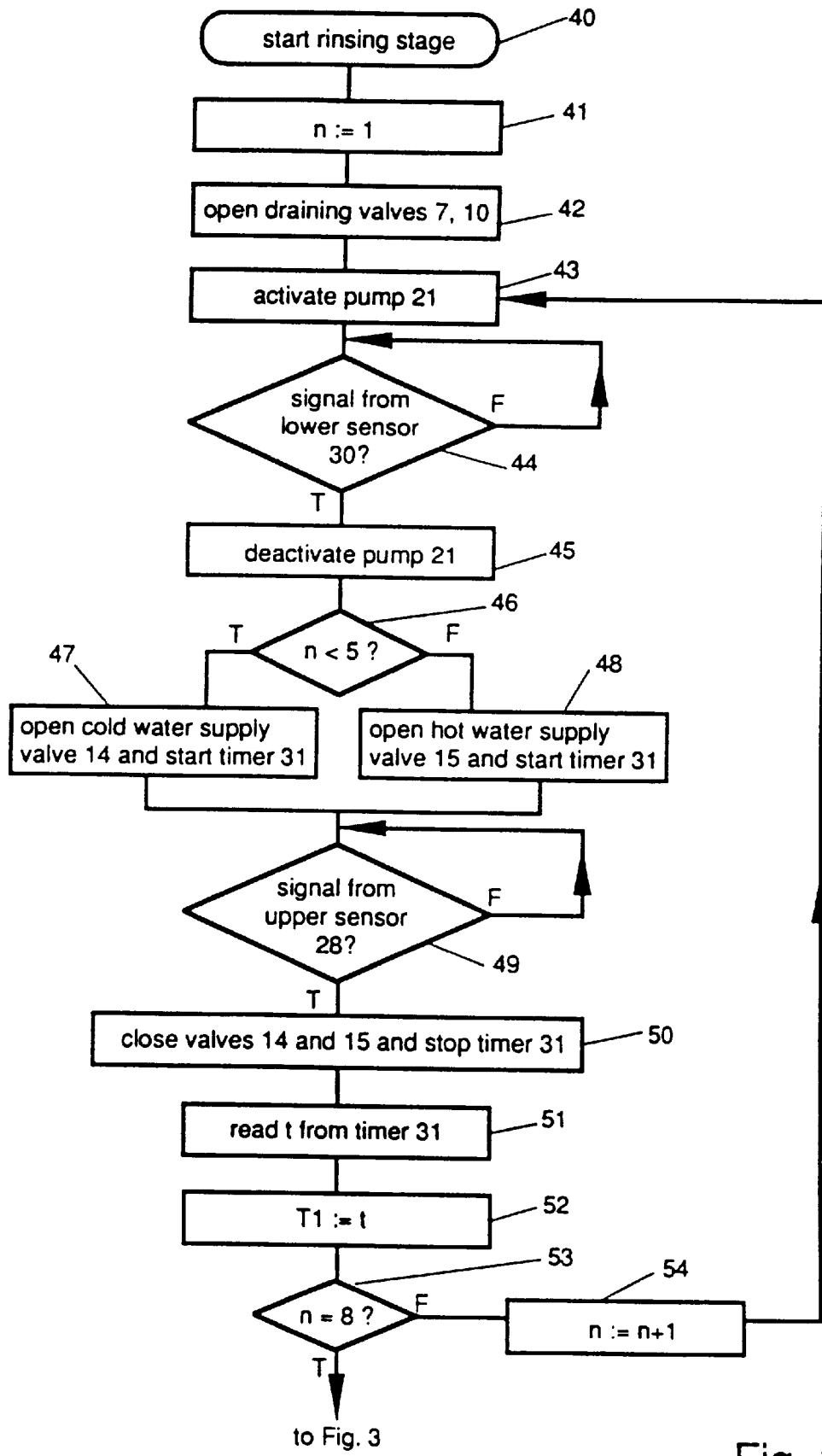
FIG. 2 is a flow chart of an exemplary mode of carrying out a rinsing stage of the method according to the invention.

In the cleaning program represented by the flow charts in FIGS. 2 and 3, at the beginning of the rinsing stage the first quantity of water is initially accumulated at least once in the buffer reservoir 17 in the form of cold water. At the end of the rinsing stage the first quantity of warm water is accumulated in the buffer reservoir at least once in the form of warm water. The second quantity of water accumulated during the washing stage is also warm water. Since the flow rates of warm and cold water may be different, for example due to the presence of a water heating device in the hot water supply structure, the first period of time determining the time required for accumulating the second quantity of water is preferably measured during accumulation of the warm water in the buffer reservoir 17.

It is observed that the present invention is not limited to the examples described hereinbefore, but may for example also be carried out with only one water level sensor if the buffer reservoir is completely emptied. The sensor for sensing the quantity of water can also be a pressure sensor, which senses the quantity of water in the buffer tank or a scale which senses the weight of the buffer tank an its contents. Alternatively, the buffer reservoir may be of a design which is automatically emptied partially or completely each time it has been filled with a predetermined quantity of water. In that case the water sensor will have to send a signal to the control unit each time the buffer reservoir is emptied. Furthermore, the timer may be incorporated in the control unit. Instead of being measured during the rinsing stage or during both the rinsing stage and the washing stage, the time for accumulating the first quantity of water may also be measured exclusively during the washing stage, for example in the manner as described hereinbefore.

What is claimed is:

1. A method of cleaning a milk tank, comprising:
   a rinsing stage comprising the steps of accumulating at least one predetermined first quantity of water from a water supply in a buffer reservoir using a first period of time and subsequently rinsing the milk tank with said first quantity of water, and
   a washing stage comprising the steps of accumulating a predetermined second quantity of water from said water supply in the milk tank and subsequently washing the milk tank with said second quantity of water,
   wherein the improvement comprises the steps of:
   measuring said first period of time used for accumulating said first quantity of water in the buffer reservoir;
   determining a second period of time for accumulating said predetermined second quantity of water from said measured first period of time and said first and second quantities of water; and
   supplying water from said water supply to the milk tank during the washing stage for a period having a duration equal to said determined second period of time.

2. A method according to claim 1, wherein said first period of time is measured each time said predetermined first quantity of water is accumulated in the buffer reservoir and an alarm signal is generated if said measured first period of time does not fulfill a predetermined condition.

3. A method according to claim 1, wherein said first period of time is measured at least once during the rinsing stage.

4. A method according to claim 1, wherein said second quantity of water is larger than said first quantity of water, said second quantity of water is supplied to the milk tank via said buffer reservoir and said first quantity of water is accumulated in said buffer reservoir while said first period of time is measured at least once during the supply of said second quantity of water.

5. A method according to claim 1, wherein the rinsing stage has a beginning and an end and at the beginning of the rinsing stage said first quantity of water is initially accumulated in the buffer reservoir at least once as cold water and at the end of the rinsing stage said first quantity of water is accumulated in the buffer reservoir at least once as warm water, said second quantity of water accumulated during said washing stage is accumulated in the form of warm water and said first period of time, from which said second period of time required for accumulating the second quantity of water is determined, is measured during accumulation of the warm water in the buffer reservoir at the end of the rinsing stage.

6. An apparatus for cleaning a milk tank, comprising:
- a buffer reservoir;
- at least one sensor for determining a first quantity of water in said buffer reservoir;
- at least one water supply means leading to the buffer reservoir;
- a shut-off valve means for opening and closing the water supply means;
- at least one transfer conduit communicating with the buffer reservoir for directing water from the buffer reservoir to the milk tank in order to accumulate a predetermined second quantity of water therein;
- means for controlling the passage of water through said transfer conduit;
- a timer; and
- a control unit including said timer or connected to said timer for determining at least a first period of time used for supplying said first quantity of water, said control unit being connected to said shut-off valve means and to said means for controlling the passage of water through said transfer conduit,
- wherein said control unit is operatively connected to said sensor and programmed for measuring said first period of time starting with the opening of the shut-off valve means or upon stopping of the passage of water through said transfer conduit and ending in response to a signal from said sensor, for determining a second period of time from said measured first period of time and said first and second quantities of water and for opening said shut-off valve means during the washing stage for a period of a duration equal to said determined second period of time.

7. An apparatus according to claim 6, wherein the buffer reservoir is dimensioned to accumulate a single batch of said first quantity of water therein.

8. A method of cleaning a milk tank, comprising:
- a rinsing stage comprising the steps of accumulating at least one predetermined first quantity of water from a water supply in a buffer reservoir and subsequently rinsing the milk tank with said first quantity of water, and
- a washing stage comprising the steps of accumulating a predetermined second quantity of water from said water supply in the milk tank and subsequently washing the milk tank with said second quantity of water,
- wherein accumulating said first quantity of water takes a first period of time,
- wherein the improvement comprises the steps of:
- measuring said first period of time used for accumulating said first quantity of water in the buffer reservoir during said rinsing stage, said washing stage, or both said rinsing stage and said washing stage;
- determining a second period of time used for accumulating said predetermined second quantity of water from said measured first period of time and said first and second quantities of water; and
- supplying water from said water supply to the milk tank during the washing stage for a period having a duration equal to said determined second period of time.

9. A method according to claim 8, wherein said first period of time is measured each time said predetermined first quantity of water is accumulated in the buffer reservoir and an alarm signal is generated if said measured first period of time does not fulfil a predetermined condition.

10. A method according to claim 8, wherein said first period of time is measured at least once during the rinsing stage.

11. A method according to claim 8, wherein said second quantity of water is larger than said first quantity of water, said second quantity of water is supplied to the milk tank via said buffer reservoir, and said first quantity of water is accumulated in said buffer reservoir while said first period of time is measured at least once during the supply of said second quantity of water.

12. A method according to claim 8, wherein the rinsing stage has a beginning and an end and at the beginning of the rinsing stage said first quantity of water is initially accumulated in the buffer reservoir at least once as cold water and at the end of the rinsing stage said first quantity of water is accumulated in the buffer reservoir at least once as warm water, said second quantity of water accumulated during said washing stage is accumulated in the form of warm water and said first period of time, from which said second period of time required for accumulating the second quantity of water is determined, is measured during accumulation of the warm water in the buffer reservoir at the end of the rinsing stage.

* * * * *